(12) United States Patent
Miyauchi

(10) Patent No.: US 10,540,752 B2
(45) Date of Patent: Jan. 21, 2020

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Takashi Miyauchi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 15/164,037

(22) Filed: May 25, 2016

(65) Prior Publication Data

US 2016/0358020 A1 Dec. 8, 2016

(30) Foreign Application Priority Data

Jun. 4, 2015 (JP) .................. 2015-114187

(51) Int. Cl.
*G06F 15/00* (2006.01)
*G06T 3/60* (2006.01)
*H04N 1/04* (2006.01)
*H04N 1/00* (2006.01)

(52) U.S. Cl.
CPC ........... *G06T 3/60* (2013.01); *H04N 1/00344* (2013.01); *H04N 1/04* (2013.01); *H04N 2201/0039* (2013.01); *H04N 2201/0094* (2013.01)

(58) Field of Classification Search
CPC .... G06T 3/60; G06K 9/00442; G06K 9/3208; G06K 9/6257; G06K 9/6284; H04N 1/00344; H04N 1/04
USPC .......................................................... 358/403
See application file for complete search history.

(56) References Cited

U.S. PATENT DOCUMENTS

| 8,254,669 B2 * | 8/2012 | Nishida ............... G06K 9/00456 382/155 |
| 8,532,434 B2 | 9/2013 | Morimoto |
| 2010/0067809 A1 * | 3/2010 | Kawata ............. G06F 17/30262 382/224 |
| 2010/0316295 A1 | 12/2010 | Morimoto |
| 2015/0109642 A1 * | 4/2015 | Gabe .................. H04N 1/00809 358/448 |

FOREIGN PATENT DOCUMENTS

JP 2010-288229 A 12/2010

* cited by examiner

*Primary Examiner* — Mark R Milia
(74) *Attorney, Agent, or Firm* — Venable LLP

(57) ABSTRACT

A server receives an input image group from an MFP. The server decides a reference image from the input image group, and generates rotated images by deforming the reference image. The server calculates image feature amounts from the reference image and the rotated images, and generates direction determiners using the image feature amounts. With respect to each of images of the input image group, the server determines the directions of the images by applying the direction determiners, and when the directions of the images are different from the direction of the reference image, the images are rotated to the direction of the reference image, and the directions of each of the images of the input image group are unified. The server generates a classification rule to be used in classification of images using the input image group in which the directions are unified.

8 Claims, 12 Drawing Sheets

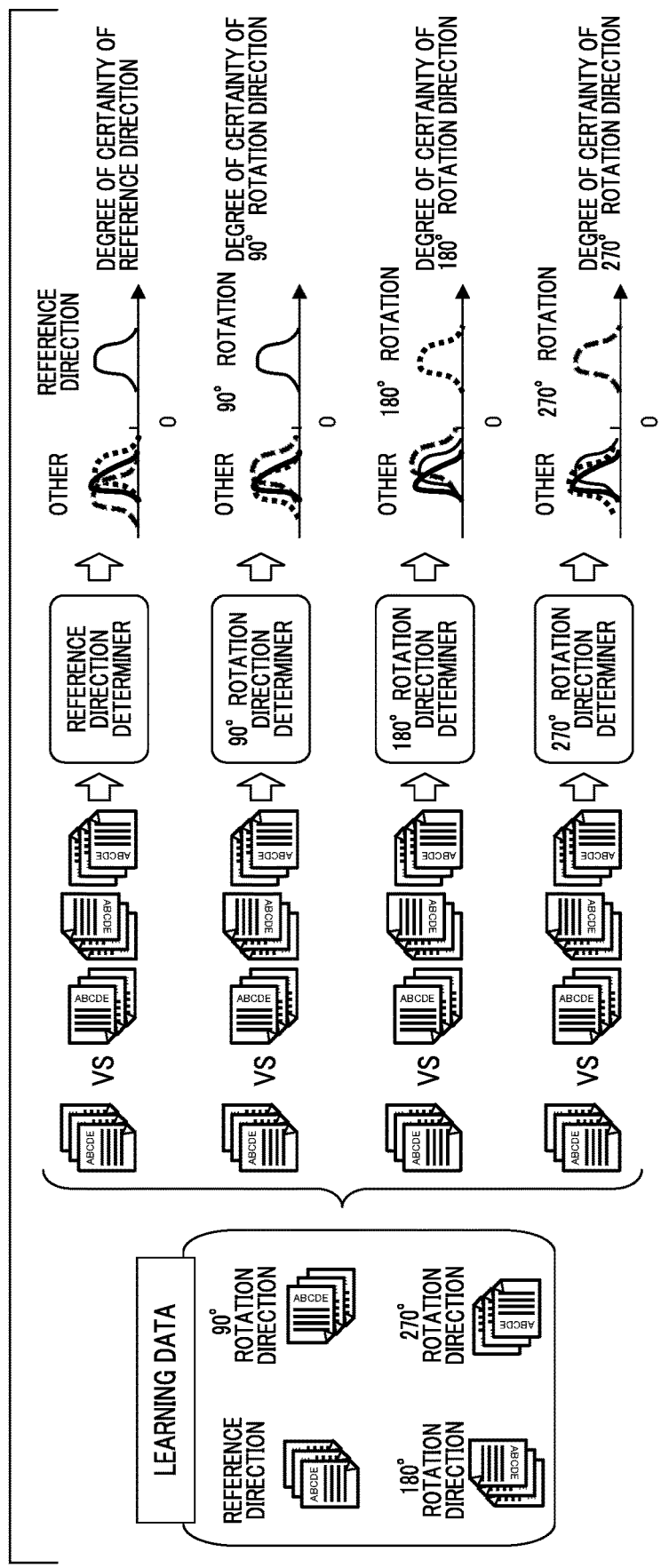

INFORMATION PROCESSING APPARATUS, CONTROL METHOD, AND STORAGE MEDIUM

BACKGROUND OF THE INVENTION

Field of the Invention

The present invention relates to an information processing apparatus, a control method, and a storage medium.

Description of the Related Art

As one of technologies for realizing a flow of work for dealing with paper forms (paper business forms) to be efficient, image classification using machine learning has been proposed. The image classification using machine learning includes two processes of learning and classification in general, in which classification rules are built through learning with a given image group (learning set), and input images thereof are classified based on the built classification rules. In other words, a learning set is learning data to be used in learning classification rules for classifying images input to a system.

If such image classification in which machine learning is used is applied to a flow of work for dealing with paper forms, automatic decision of a storage location or a distribution location of scanned images, automatic generation of file names, and the like are possible. In addition, it is also possible to build classification rules that are customized for individual customers by learning from forms (business forms) that are prepared for each of them.

If properties of an image to be used in a learning process and a classifying process are different, sufficient classification accuracy will not be obtained, and thus it is generally necessary to prepare a large amount of images as learning data taking input images at the time of classification into consideration. In addition, to build classification rules from paper forms for each customer, it is necessary to prepare a learning set (learning data) for each customer using an input apparatus such as a multi-function peripheral (MFP) having a scanner.

When the learning set is to be prepared on site, scanning one form in a plurality of sessions or scanning a plurality of forms together is conceivable. However, when one form is scanned in a plurality of sessions, cases in which the form is set on a scanner in different directions are conceivable. In addition, when a plurality of forms is scanned in one session, mixing of documents having different directions is conceivable. If forms of the same type are registered as a learning set in different directions, it is not possible to perform learning well. For this reason, it is necessary for a form to be registered in a learning set to have an image set in the same direction as that of the same type of forms. Japanese Patent Laid-Open No. 2010-288229 discloses a method for realizing determination of a direction of a form by cutting out a partial region that includes letters from the form and using a letter recognition process thereon in four directions.

In the method in which the letter recognition process is used to determine a direction of a form, however, the accuracy in recognition of letters is directly reflected in the accuracy in determination of the direction. In addition, even if sufficient accuracy in recognition of letters can be achieved, a dictionary for recognizing letters should be replaced in accordance with the language of a form. For this reason, in order to respond to forms in all languages, as many dictionaries for recognizing letters as the number of languages should be prepared.

SUMMARY OF THE INVENTION

The present invention provides an information processing apparatus that can generate high-quality learning data even when input images having different directions are mixed in an input image group serving as a source of the learning data to be used in learning of a classification rule for classifying images.

According to an aspect of the present invention, an information processing apparatus includes: a reception unit configured to receive a plurality of input images; a rotated image generation unit configured to decide a reference image from the plurality of input images, and generate a rotated image obtained by rotating the reference image to a predetermined direction different from the direction of the reference image; a determiner generation unit configured to generate a direction determiner configured to determine the direction of each of the plurality of input images based on the reference image and the rotated image; a direction unifying unit configured to determine the direction of each of the plurality of input images by applying the direction determiner, and align the directions of the plurality of input images by unifying the direction of each of the plurality of input images with the direction of the reference image in accordance with the determined direction; and a classification rule generation unit configured to generate a classification rule to be used in classification of images input to the information processing apparatus by using the plurality of input images whose directions have been unified by the direction unifying unit.

Further features of the present invention will become apparent from the following description of exemplary embodiments (with reference to the attached drawings).

BRIEF DESCRIPTION OF THE DRAWINGS

FIG. 9 is a diagram illustrating an example of machine learning using learning data.

DESCRIPTION OF THE EMBODIMENTS

Hereinafter, embodiments of the present invention will be described with reference to the drawings.

First Embodiment

Figure 1:
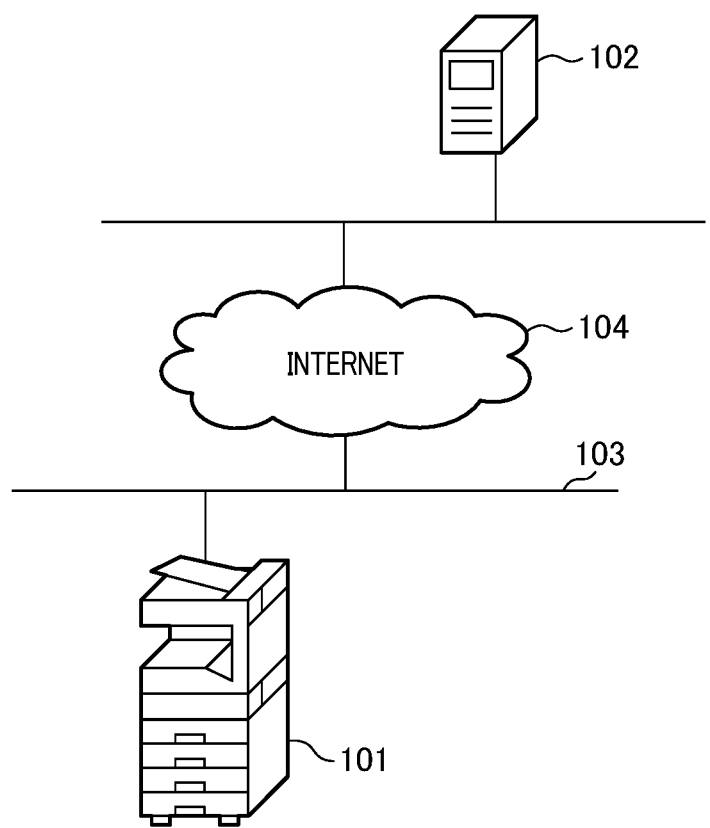
FIG. 1 is a diagram illustrating a system configuration according to a first embodiment.

FIG. 1 is a diagram showing a system configuration according to a first embodiment of the present invention.

The system according to the first embodiment includes an MFP 101 that is an image input device and a server 102. The MFP 101 is connected to a LAN 103. In addition, the LAN 103 is connected to the Internet 104, and is also connected to the server 102 that provides a service via the Internet 104.

The MFP 101 and the server 102 are connected to each other via the LAN 103 and perform transmission and reception of image data and various kinds of information. Although the MFP 101 is connected to the LAN 103 in this example, it is not limited thereto as long as the MFP 101 can be connected to the server 102. Note that the server 102 is an information processing apparatus that generates learning data to be used in learning a classification rule of images input from an image input device. Specifically, the server 102 generates learning data obtained by unifying rotation directions of the images input from the image input device, and builds a classification rule for the images based on the generated learning data.

Figure 2A:
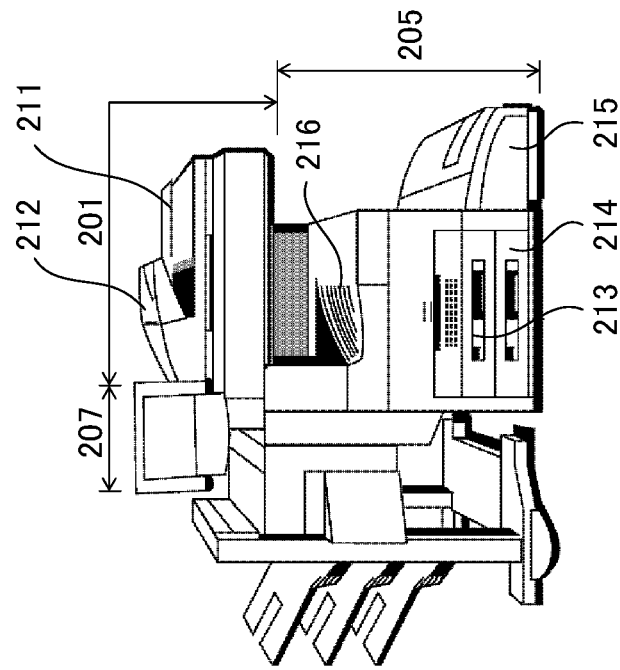
FIGS. 2A and 2B are diagrams illustrating a configuration example of an MFP.
Figure 2B:
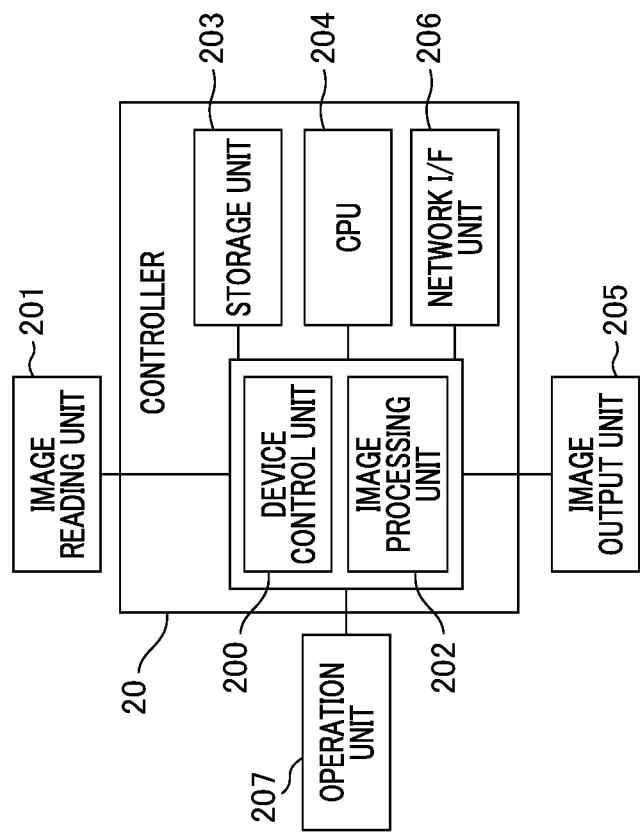

FIGS. 2A and 2B are diagrams showing a configuration example of the MFP.

FIG. 2A is a diagram showing an example of a hardware configuration of the MFP 101. As shown in FIG. 2A, the MFP 101 includes from a controller 20 to an operation unit 207. A device control unit 200 performs exchange of data with an internal part of the MFP 101 or an external part via a network I/F unit 206, and receives operations from the operation unit 207. An image reading unit 201 reads images of documents and outputs image data.

An image processing unit 202 converts print information that includes image data input from the image reading unit 201 or an outside into intermediate information (hereinafter referred to as an "object"), and stores the information in an object buffer of a storage unit 203. An object has attributes of text, graphics, and an image. Furthermore, the image processing unit 202 generates bit map data based on the object stored in the buffer, and stores the data in the buffer of the storage unit 203. At that time, a color conversion process, a density adjustment process, a total toner amount control process, a video-count process, a printer gamma correction process, a pseudo halftone process such as dithering, or the like is performed.

The storage unit 203 is configured as a read only memory (ROM), a random access memory (RAM), a hard disk drive (HDD), or the like. The ROM stores various control programs and image processing programs executed by a CPU 204. The RAM is used as a reference area in which the CPU 204 stores data or various kinds of information or a work area. In addition, the RAM and the HDD are used as buffers or the like in which such an object described above is stored. Image data is accumulated in the RAM and the HDD, pages are sorted or documents that include a plurality of sorted pages are accumulated, and a plurality of copies are printed out.

An image output unit 205 forms a color image on a recording medium such as recording paper and outputs it. The network I/F unit 206 connects the MFP 101 to the LAN 103 to perform transmission and reception of various kinds of information to and from the Internet 104 or another device. The operation unit 207 includes a touch panel or an operation button, and receives operations from a user and transmits information of the operations to the device control unit 200.

FIG. 2B is a diagram showing an example of the appearance of the MFP 101. The image reading unit 201 has a plurality of CCDs. When the CCDs have different levels of sensitivity, even if the densities of pixels of a document are the same, the pixels are perceived as having different densities. For this reason, the image reading unit performs exposure scanning for a white plate (a uniformly white plate) first, converts an amount of reflection light obtained from the exposure scanning into an electric signal, and then outputs the signal to the controller. Note that a shading correction unit provided inside the image processing unit 202 perceives a difference in sensitivity of the CCDs based on the electric signal obtained from each of the CCDs. Then, using the difference in the perceived sensitivity, the value of an electric signal obtained by scanning an image of a document is corrected.

Furthermore, upon receiving information of gain adjustment from the CPU 204 provided inside the controller 20, the shading correction unit performs gain adjustment according to the information. Gain adjustment is used for adjusting how the value of an electric signal obtained by performing exposure scanning on a document is allocated to luminance signal values from 0 to 225. Through the gain adjustment, the value of the electric signal obtained by performing exposure scanning on the document can be converted into a high luminance signal value or into a low luminance signal value. In other words, a dynamic range of a read signal can be adjusted through the gain adjustment.

Next, a configuration for scanning an image of a document will be described.

The image reading unit 201 converts information of an image into an electric signal by inputting reflection light obtained by performing exposure scanning for an image of a document into the CCDs. Furthermore, the electric signal is converted into a luminance signal that includes the colors red R, green G, and blue B, and the luminance signal is output to the controller 20 as an image.

Note that documents are set on a tray 212 of a document feeder 211. When a user instructs a start of reading with the operation unit 207, the controller 20 gives an instruction of reading the documents to the image reading unit 201. Upon receiving the instruction, the documents are fed from the tray 212 of the document feeder 211 one by one and then the image reading unit 201 performs a document reading operation. Note that a document reading method is not limited to an automatic feeding method by the document feeder 211, and a method in which a document is placed on a glass plane that is not illustrated and is scanned by moving an exposure unit is possible.

The image output unit 205 is an image forming device that forms an image received from the controller 20 on a sheet. Note that, although an image forming method is an electrographic method that uses a photosensitive drum or a photosensitive belt in the present embodiment, it is not limited thereto. For example, the present invention can be applied to an inkjet method in which ink is ejected from a fine nozzle array for printing on a sheet, or the like. In addition, the image output unit 205 is provided with a plurality of sheet cassettes 213 to 215 which enable different sheet sizes or different sheet directions to be selected. Printed sheets are discharged to a paper discharge tray 216.

Figure 3:
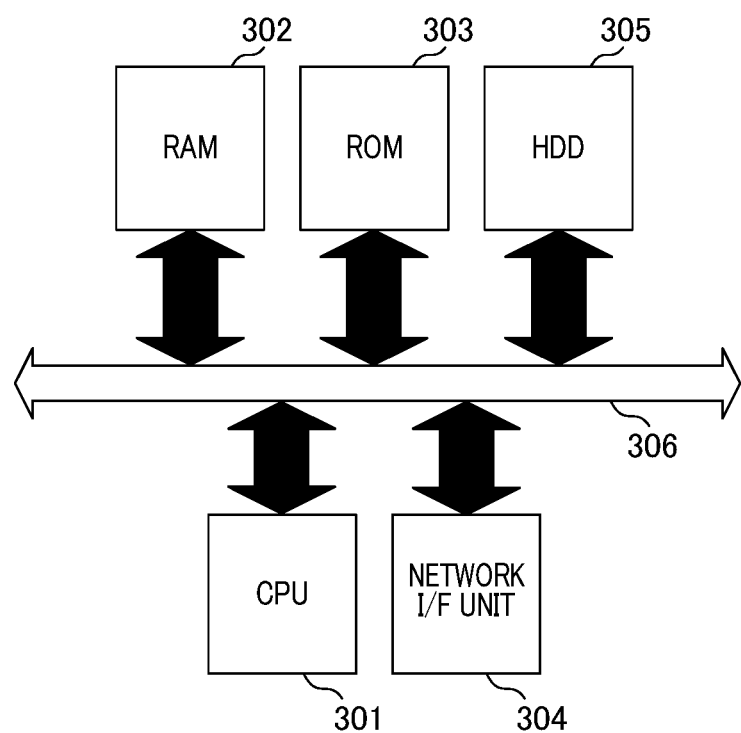
FIG. 3 is a diagram illustrating a configuration example of a server.

FIG. 3 is a diagram showing an example of a hardware configuration of the server.

The server 102 includes from the CPU 301 to a data bus 306. The CPU 301 reads a control program stored in the ROM 303 and executes various control processes. The RAM 302 is used as a main memory and a temporary storage area such as a work area of the CPU 301. A network I/F unit 304 connects the server 102 to the Internet 104 for transmission and reception of various kinds of information to and from another device. An HDD 305 stores image data, feature amount data, various programs, and the like.

In FIG. 3, via the data bus 306, the CPU 301, the RAM 302, and the ROM 303 transmit and receive image data received from the MFP 101 via the network I/F unit 304. As the CPU 301 executes an image processing program stored in the ROM 303 or the HDD 305, image processing for the image data is realized.

<Details of an Image Classification Rule Learning Process According to the First Embodiment>

Figure 4:
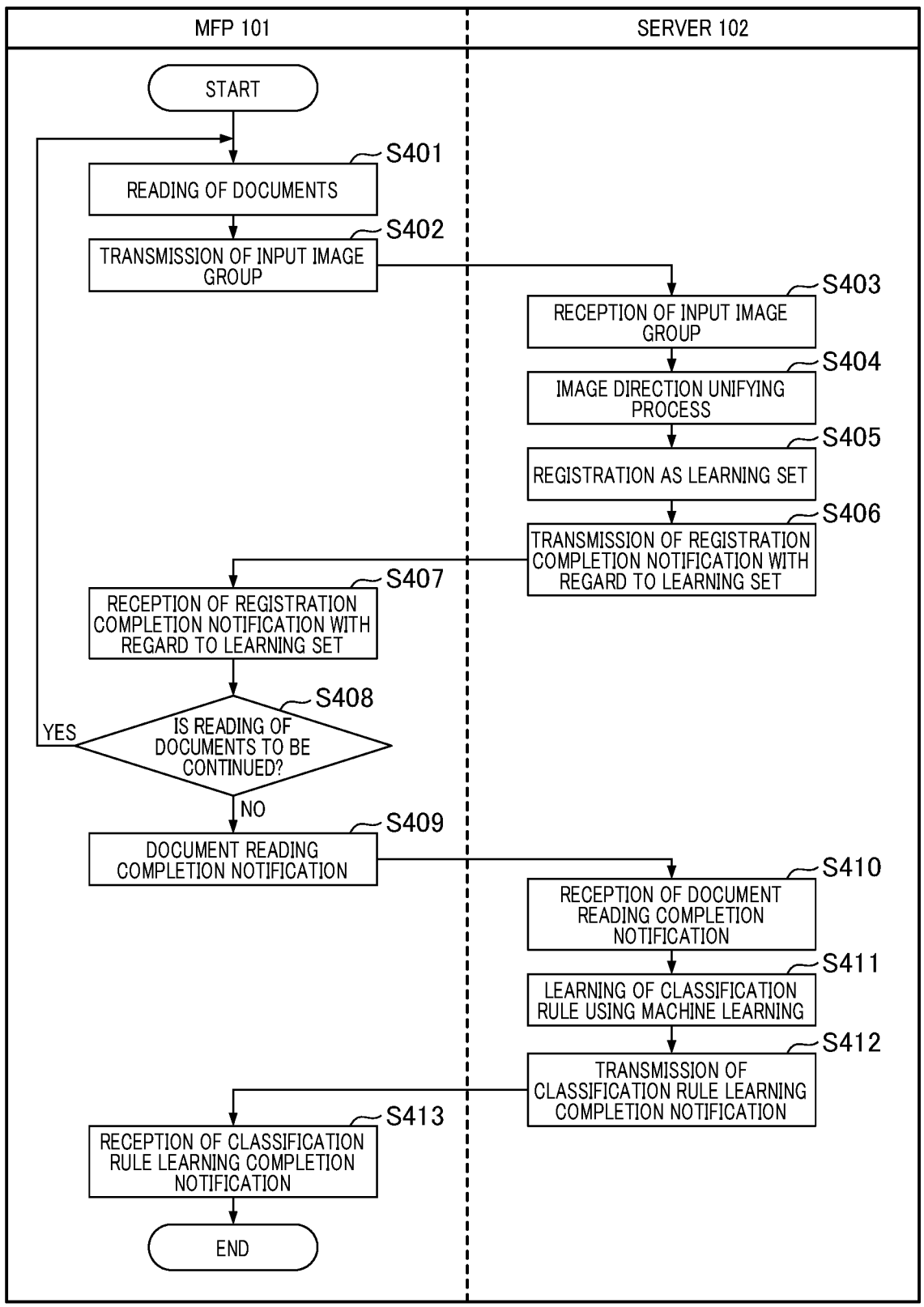
FIG. 4 is a flowchart illustrating an image classification rule learning process.

FIG. 4 is a flowchart for describing an image classification rule learning process.

The process shown in FIG. 4 is executed by the MFP 101 and the server 102. In the process shown in FIG. 4, the process executed by the MFP 101 is realized as the CPU 204 loads a processing program stored in the storage unit 203 in the storage unit 203 and causes the program to be executed. In addition, the process executed by the server 102 is realized as the CPU 301 loads a processing program stored in the HDD 305 in the RAM 302 and causes the program to be executed.

When the MFP 101 receives an instruction of a user from the operation unit 207, documents are fed from the tray 212 of the document feeder 211 one by one, and the image reading unit 201 reads the documents in Step S401. Note that the documents set on the tray 212 are assumed to be the same type of forms and to be classified in the same classification category according to an image classification rule. In Step S402, the MFP 101 transmits image data read by the image reading unit 201 to the server 102 via the network I/F unit 206.

In Step S403, the server 102 receives the image data (input image) from the MFP 101 via the LAN 103 and the Internet 104. The CPU 301 stores a plurality of pieces of received image data in the HDD 305 as an input image group. In Step S404, the server 102 executes an image direction unifying process of unifying directions of the input image group stored in Step S403. Details of the image direction unifying process will be described using FIG. 5.

In Step S405, the server 102 registers the input image group of which the directions have been unified in Step S404 in the HDD 305 as a learning set. In Step S406, the server 102 transmits a registration completion notification with regard to the learning set to the MFP 101 via the network I/F unit 304. In Step S407, the MFP 101 receives the registration completion notification with regard to the learning set from the server 102 via the Internet 104 and the LAN 103.

In Step S408, the MFP 101 receives an instruction indicating whether to continue reading of documents from the user via the operation unit 207. When reading of documents is to be continued, the process returns to Step S401. When reading of documents is not to be continued, the process proceeds to Step S409. Note that the judgment of whether to continue reading of documents is not limited to the above-described method. For example, reading of documents may be continued until the counted number of readings of documents in Step S401 reaches the number of readings of documents set by the user using the operation unit 207 in advance.

In Step S409, the MFP 101 transmits a form reading completion notification to the server 102 via the network I/F unit 206. In Step S410, the server 102 receives the form reading completion notification from the MFP 101 via the LAN 103 and the Internet 104. In Step S411, the server 102 learns a classification rule for document images using machine learning. In other words, the server 102 performs classification rule generation. For learning, image feature amounts are calculated from the learning set stored in the HDD 305 and used. Note that, for an image feature amount and machine learning to be used in learning of a classification rule, the same method as that of an image feature amount and machine learning used in the image direction unifying process of Step S404 may or may not be employed.

In Step S412, the server 102 transmits a classification rule learning completion notification to the MFP 101 via the network I/F unit 304. In Step S413, the MFP 101 receives the classification rule learning completion notification from the server 102 via the Internet 104 and the LAN 103.

<Details of the Image Direction Unifying Process According to the First Embodiment>

Figure 5:
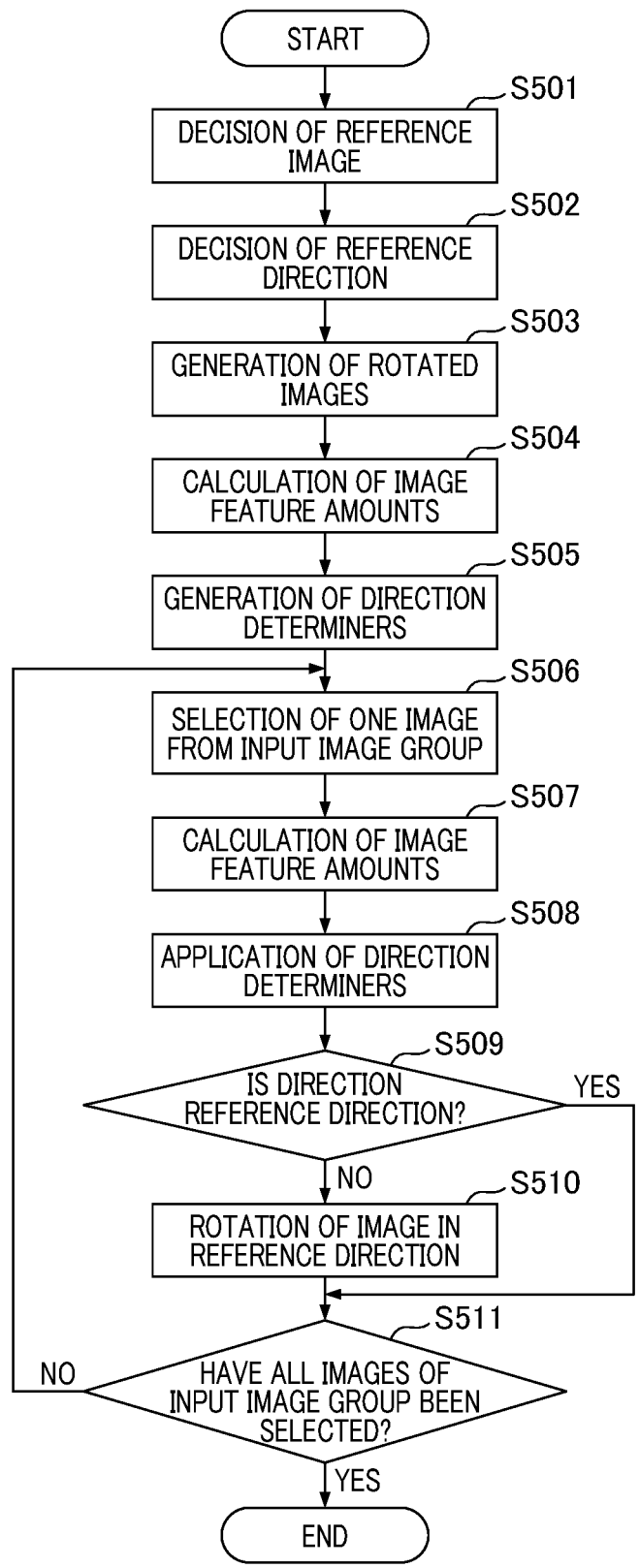
FIG. 5 is a flowchart illustrating an image direction unifying process.

FIG. 5 is a flowchart for describing the image direction unifying process.

In the image direction unifying process shown in FIG. 5, direction determiners are generated based on a reference image, and directions of the input image group are unified using the generated direction determiners. The image direction unifying process is realized as the CPU 301 of the server 102 loads the processing program stored in the HDD 305 in the RAM 302 and causes the program to be executed.

In Step S501, the server 102 decides a reference image to be used in generation of the direction determiners from the input image group. Note that, although a leading image of the input image group is set as a reference image in the present embodiment, a method of deciding a reference image is not limited thereto. For example, thumbnail images of the input image group may be displayed on the touch panel of the operation unit 207 and an instruction from the user to decide a reference image may be received.

In Step S502, the server 102 decides a reference direction that is a direction serving as a reference for unifying directions of images. Although the reference direction is set to the direction of a reference image in the present embodiment, a method of deciding a reference direction is not limited thereto. For example, a thumbnail image of a reference image may be displayed on the touch panel of the operation unit 207 and an instruction with regard to a direction may be received from the user.

In Step S503, the server 102 deforms the reference image using a simulation, and executes an image rotating process of generating rotated images obtained by rotating the reference image by a predetermined angle. In other words, the server 102 functions as a rotated image generation unit. The image rotating process is realized as the server 102 executes a projective transformation using a rotation matrix on the reference image. Since the image input device is set to the scanner of the MFP in the present embodiment, there are three predetermined angles by which the reference image is to be rotated clockwise, which are 90 degrees, 180 degrees, and 270 degrees. Note that a predetermined angle by which the reference image is to be rotated is not limited to the above-described three angles. There can be cases in which a direction of an input image can be limited depending on an image input device. In addition, if an aspect ratio of an input image can be limited in pre-processing, a direction of an image generated in the image rotating process may only be a 180-degree rotation direction.

In Step S504, the server 102 calculates image feature amounts from the reference image decided in Step S501 and the rotated images generated in Step S503. Details of the image feature amounts to be calculated will be described below using FIGS. 6 and 7. Note that, when machine learning is used to generate direction determiners in Step S505 to be described below, a learning data increasing process of increasing learning data for the direction determiners is executed to raise accuracy in determination of the direction determiners to be generated. In this case, the server 102 calculates the image feature amounts after executing the learning data increasing process. Details of the learning data increasing process will be described below using FIGS. 8A to 8C.

In Step S505, the server 102 generates direction determiners using the image feature amounts calculated in Step S504. In other words, the server 102 functions as a determiner generating unit. The direction determiners determine the reference direction decided in Step S502 or the directions of the rotated images generated in Step S503. In the present embodiment, the direction determiners are generated using machine learning. Machine learning will be described below using FIG. 9. Note that a direction determiner is not limited to one generated using machine learning. For example, a determination method in which simple matching with the image feature amounts calculated in Step S504 is performed may be possible.

In Step S506, the server 102 selects one image from the input image group. In Step S507, the server 102 calculates an image feature amount from the image selected in Step S506 in the same procedure as in Step S504. Note that, when the direction determiners are generated using machine learning in Step S505, it is not necessary to calculate all the image feature amounts that have been calculated in Step S504. Only an image feature amount necessary for the direction determiners generated in Step S505 may be calculated.

In Step S508, the server 102 executes a direction determining process. Specifically, by applying the direction determiners generated in Step S505, whether the image selected in Step S506 has the reference direction decided in Step S502 or the direction of the rotated images generated in Step S503 is determined. In Step S509, if the direction determined in Step S508 is not the reference direction decided in Step S502, the server 102 advances the process to Step S510. In addition, if the direction determined in Step S508 is the reference direction decided in Step S502, the process proceeds to Step S511.

In Step S510, the server 102 executes an image rotating process to cause the image determined not to have the reference direction in Step S509 to have the reference direction. A rotation angle of the image is decided based on the direction determined in Step S508. For example, if the image is determined to have been rotated 90 degrees clockwise, the image may be rotated 90 degrees counterclockwise. The image rotating process is executed in the same procedure as the process described in Step S503.

In Step S511, the server 102 judges whether the direction determining process has been finished for all images of the input image group. If there is an image for which the direction determining process has not been finished, the process returns to Step S506. If the direction determining process has been finished for all images, the image direction unifying process ends.

<Details of Image Feature Amounts to be Used in the Image Direction Unifying Process>

Next, image feature amounts to be used in the image direction unifying process will be described using FIGS. 6 and 7.

Figure 6:
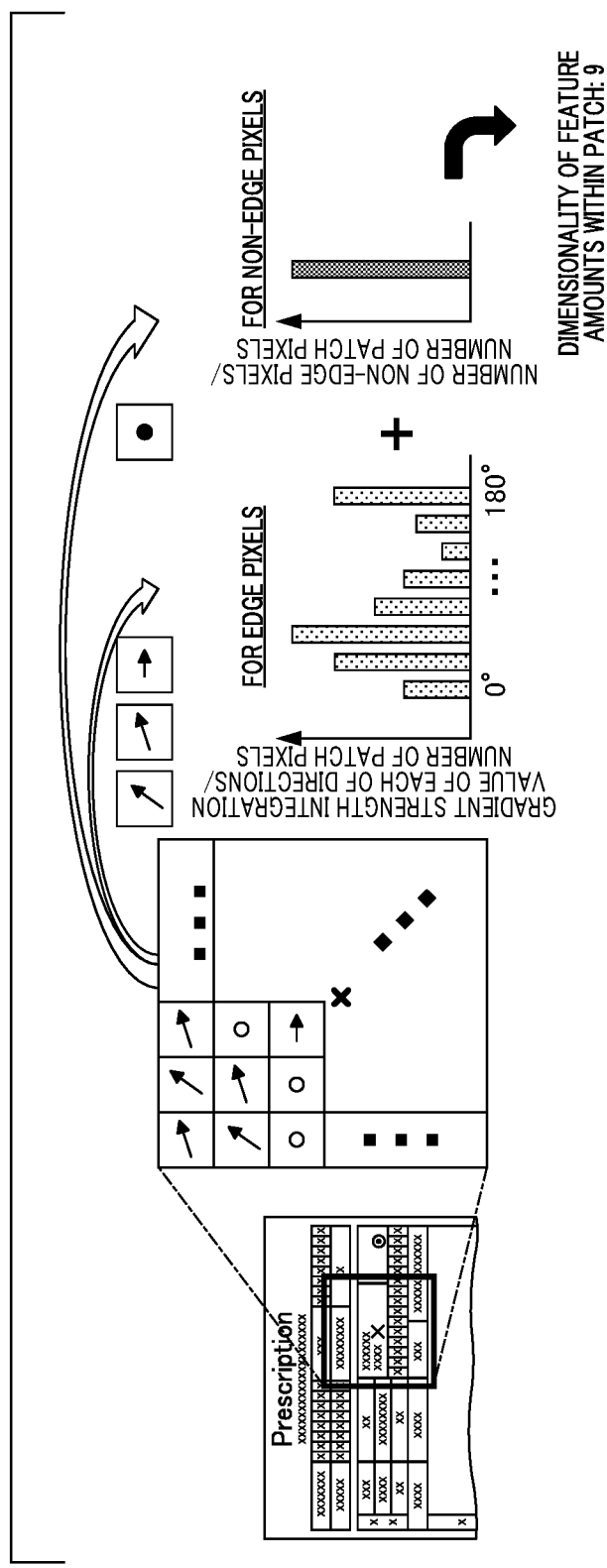
FIG. 6 is a diagram illustrating a method of calculating an image feature amount based on gradient information.

FIG. 6 is a diagram describing a method of calculating image feature amounts based on gradient information.

In the method of calculating image feature amounts shown in FIG. 6, gradient strengths and gradient directions calculated for each of pixels within a patch image are used as image feature amounts. Specifically, the CPU 301 obtains gradient strengths and gradient directions of all pixels within the patch image from edge information of the vertical direction and the horizontal direction. Using the gradient information, the CPU 301 calculates 9-dimensional (9) feature amounts from one patch as shown in FIG. 6.

To calculate the 9-dimensional feature amounts from one patch, first, pixels are set such that pixels having gradient strengths equal to or greater than a given value are set as edge pixels and pixels having gradient strengths smaller than the given value are set as non-edge pixels. Then, gradient directions of the edge pixel group are quantized to be 8 directions, and division of the gradient strength integration value of each direction by the number of patch pixels is calculated. Further, the 9-dimensional feature amounts are calculated from one patch image in accordance with the division of the number of non-edge images by the number of patch pixels. Using the edge pixels and the non-edge pixels as described above, it is possible to express not only information of ruled lines and letters but also marginal portions that are a distinctive characteristic of document images. Note that, in practice, a number of feature amounts are used not only by calculating feature amounts of one patch image as described above but also by cutting a plurality of patch images and using them.

Figure 7:
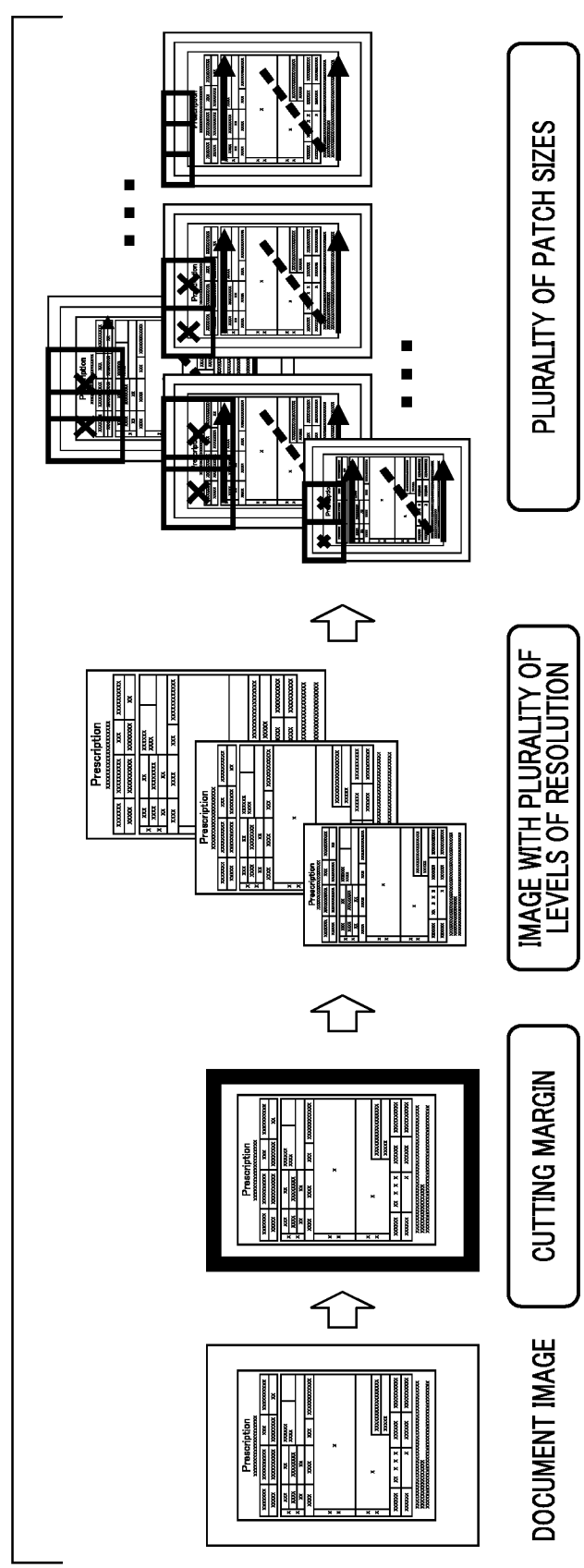
FIG. 7 is a diagram illustrating cutting of a patch image for calculating an image feature amount.

FIG. 7 is a diagram describing cutting of a patch image for calculating an image feature amount.

First, the CPU 301 deletes ends of an image at which noise easily appears, and creates images with a plurality of levels of resolution. The reason for creating the images with a plurality of levels of resolution is that the structure of edges changes depending on the levels of resolution. Next, the CPU 301 scans and cuts patch images in a plurality of sizes from each of the images with the levels of resolution, and thereby can calculate feature amounts taking positions of the patch images into consideration.

For example, a case in which feature amounts are extracted from an image scanned at 300 dpi will be described. First, the CPU 301 creates two types of images that are obtained by reducing a scanned image to sizes of ¼ and ⅛ thereof. Next, the CPU 301 shifts each patch image having the size of ¼ from the reduced image of each resolution by ⅕ and then 5×5=25 images are cut. In addition, the patch image having the size of ⅛ thereof is shifted therefrom by ¹⁄₁₀ and then 10×10=100 images are cut. Through these processes, a total of 250 patch images are cut. Then, when 9-dimensional image feature amounts are calculated from each of the patch images, 9×250=2250-dimensional feature amounts can be calculated from the one image.

Note that parameters including image resolution, a patch size, and a patch cutting position are not limited to the numbers described above. Furthermore, in addition to the above with respect to image feature amounts to be calculated, for example, a color histogram, chromatic dispersion, or the like may be set as an image feature amount to use color information of a document.

<Details of the Learning Data Increasing Process>

The learning data increasing process which is a process of increasing learning data executed when the direction determiner is generated using machine learning in the image direction unifying process will be described.

In the present embodiment, a deformed image is obtained by executing a deforming process on an image through a simulation. Then, the number of deformed images that will serve as learning data is increased through combinations of the deforming process.

Figure 8A:
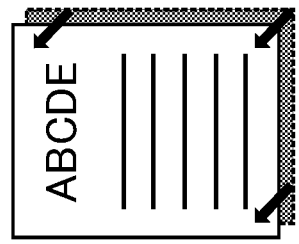
FIGS. 8A to 8C are diagrams illustrating a learning data increasing process.
Figure 8B:
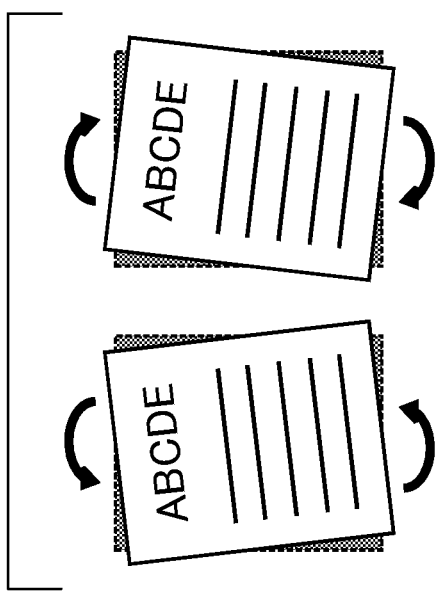
Figure 8C:
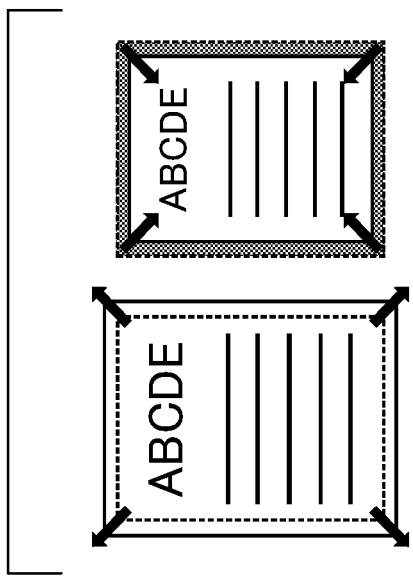

FIGS. 8A to 8C are diagrams describing the learning data increasing process. Specifically, they are diagrams for describing a shift process, a rotating process, and an enlarging and reducing process that are deforming processes.

Geometric deforming processes such as the shift process, rotating process, and the enlarging and reducing process are realized using a projective transformation matrix. FIG. 8A shows a shift process. In the shift process, deformed images of 8 patterns are obtained by moving an image to upper, lower, left, and right sides, and to upper-left, upper-right, lower-left, and lower-right sides in parallel by a given amount. FIG. 8B shows the rotating process. In the rotating process, deformed images of two patterns are obtained by rotating an image clockwise and counterclockwise by a given amount. FIG. 8C shows the enlarging and reducing process. In the enlarging and reducing process, deformed images of two patterns are obtained by enlarging and reducing an image at given ratios.

Note that, in the deforming processes, the input image and the output images have the same size. An out-of-image region protruding to the outside of the image region of the output images is discarded after the projective transformation. In addition, a defective region in which a projection source is not present inside the output images is complemented by sequentially copying values of non-defective pixels. A way of treating such a defective region is not limited to complementation using the method described above. For example, another complementation method of replacing a defective one with a background pixel estimated from the input image may be used, or a method of giving flag information indicating a defective pixel to a defective pixel and using it in a mask process may be used without performing complementation.

In the learning data increasing process, the number of deformed images can be increased as learning data by combining deformed patterns, by also causing the patterns resulting from the deforming processes that are the shift process, the rotating process, and the enlarging and reducing process to include patterns that are obtained without deforming the aforementioned patterns. In other words, as many deformed image as the number of combinations of the deformation patterns can be obtained from data of one image. Specifically, if the patterns obtained without deformation are added to the patterns resulting from the deforming processes described above, 9 patterns are obtained from the shift process, 3 patterns from the rotating process, and 3 patterns from the enlarging and reducing process. Then, if the patterns of each of the processes are combined, deformed images of 3×9×3=81 patterns are generated from one image, and thereby the amount of learning data increases. Note that the number of patterns of each of the deforming processes is not limited to the numbers described above.

<Details of Machine Learning to be Used>

Next, a machine learning technique to be used in generation of a direction determiner in the present embodiment will be described.

In the present embodiment, a known technique called Real AdaBoost is used as a machine learning technique. Real AdaBoost is a method in which feature amounts fitted to classification of given learning data are selected from huge feature amounts, the feature amounts are combined, and thereby a classifier can be constituted. If huge feature amounts are used during classification of images, performance deteriorates due to a calculation load of the feature amounts. Such an operation of selecting feature amounts fitted to classification, using only some feature amounts, and thereby constituting a classifier is a great advantage of Real AdaBoost.

However, Real AdaBoost is a 2-class classifier for classifying data with labels of two types. In other words, it is not possible to use the technique in determination of directions of three or more types of document images. Thus, a known method called One-Versus-All (OVA) for expanding a 2-class classifier to a multi-class classifier is used. In OVA, as many classifiers for classification into one class (a target class) and other classes are created as the number of the classes, and the output of the classifiers is set as the level of reliability of the target class. For classification, data that is desired to be classified is input to all the classifiers, and the class with the highest level of reliability is set as a classification category.

FIG. 9 is a diagram describing an example of machine learning using learning data.

In this example, it is assumed that image feature amounts corresponding to each of images of 4 classes (images of a reference direction, a 90° ☐rotation direction, a 180° rotation direction, and a 270° rotation direction) are prepared as learning data. In order to classify the 4 classes, 4 types of classifiers are prepared in OVA. In other words, the 4 types of classifiers include a reference direction determiner for determining the reference direction and directions other than the reference direction (other rotation directions), and a 90° rotation direction determiner for determining the 90° rotation direction and other rotation directions. Further, they include a 180° rotation direction determiner for determining the 180° rotation direction and other rotation directions, and a 270° rotation direction determiner for determining the 270° rotation direction and other rotation directions.

When an image having the reference direction is input to the reference direction determiner, a high output value (degree of certainty) is output, and when an image of another rotation direction is input, a low output value (degree of certainty) is output. The same applies to the 90° rotation direction determiner, the 180° rotation direction determiner, and the 270° rotation direction determiner. When actual classification is performed, an input document image is input to the 4 types of classifiers, output values thereof are compared to each other, and a rotation direction is decided. For example, when an output of the 180° rotation direction determiner has a maximum value, the input document image is determined to have the 180° rotation direction.

Learning of multi-class classifiers using Real AdaBoost described with reference to FIG. 9 and document image classification using multi-class classifiers are executed by the CPU 301. Note that a machine learning technique that can be used in the present embodiment is not limited to the above-described techniques. For example, known techniques such as Support Vector Machine or Random Forest may be used. When the mechanism of selecting feature amounts is not included in a machine learning technique to be used, it is also possible to perform known feature amount selection such as feature amount selection using analysis of a main component or analysis of determination to improve a classification speed during classification. When a machine learning technique to be used is a 2-class classifier, a known technique such as All-Versus-All (AVA) or Error-Correcting Output-Coding (ECOC) may be used rather than OVA.

According to the present embodiment, directions of an image to be used in generation of learning data can be unified by generating direction determiners corresponding to the various directions of images input from an image input device such as an MFP as described above. Accordingly, even when images having various directions are included in images input from an image input device, it is possible to generate high-quality learning data.

Second Embodiment

In the first embodiment, documents set on the tray of the MFP are assumed to be forms of the same type. In other words, documents read by the image reading unit of the MFP together are assumed to be forms of the same type. For this reason, the server uniformly executes the image direction unifying process for the input image group read together. On the other hand, in the present embodiment, a case in which documents that are set on a tray and read by an image reading unit together are forms of different types is assumed. Specifically, a case in which a set of documents in which different types of forms are arranged in a fixed order are read is assumed. Note that only different parts from the first embodiment will be described below.

<Details of a Process of Learning an Image Classification Rule According to the Second Embodiment>

Figure 10:
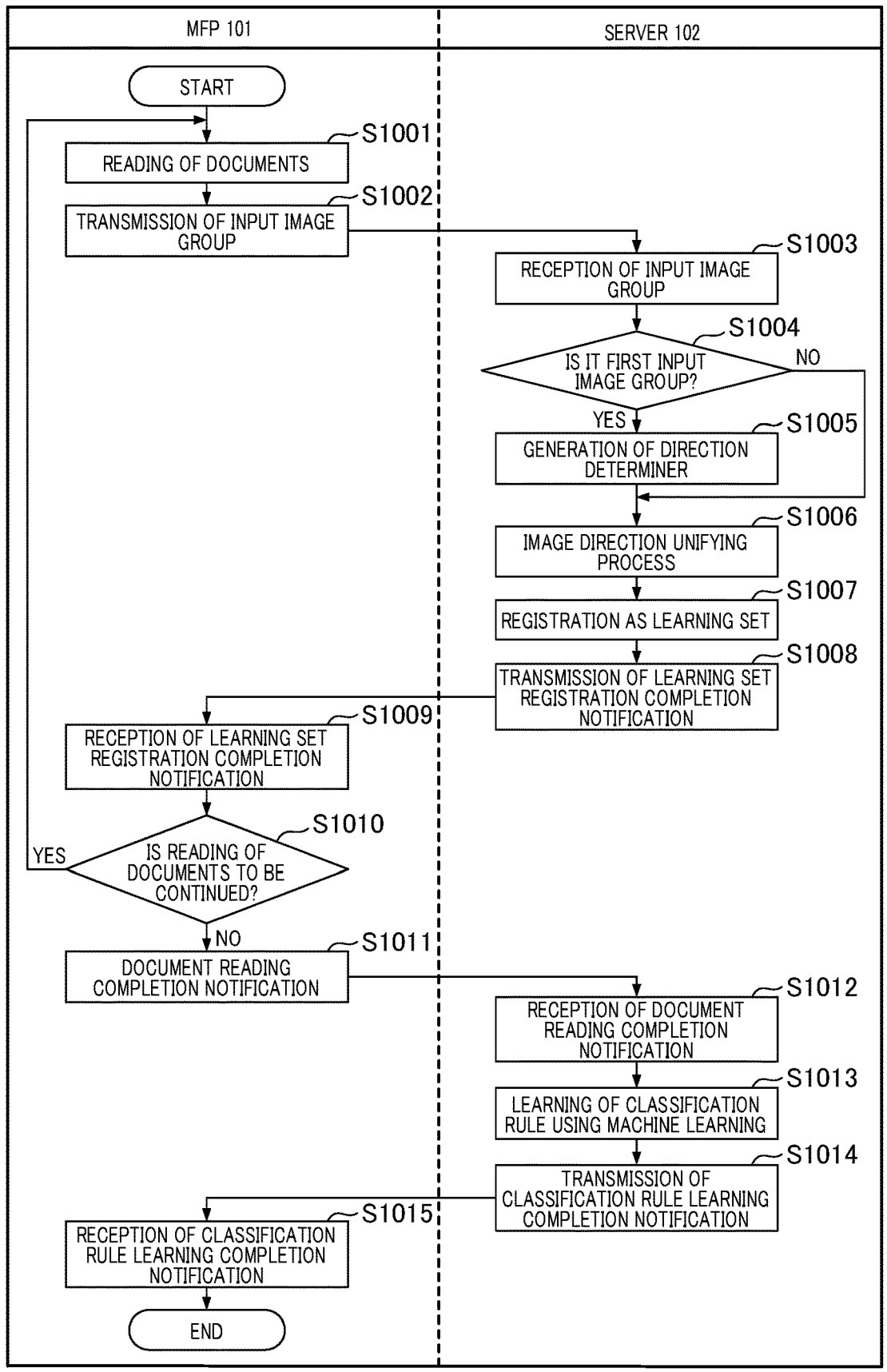
FIG. 10 is a flowchart illustrating an image classification rule learning process.

FIG. 10 is a flowchart for describing a process of learning an image classification rule according to the present embodiment.

The process shown in FIG. 10 is executed by the MFP 101 and the server 102. In the process shown in FIG. 10, the process executed by the MFP 101 is realized as the CPU 204 loads the processing program stored in the storage unit 203 in the storage unit 203 and causes the program to be executed. In addition, the process executed by the server 102 is realized as the CPU 301 loads the processing program stored in the HDD 305 in the RAM 302 and causes the program to be executed.

In Step S1001, upon receiving an instruction of a user from the operation unit 207, the MFP 101 feeds documents from the tray 212 of the document feeder 211 one by one, and reads the documents using the image reading unit 201. Here, the documents set on the tray 212 are assumed to be constituted by different types of forms, and to be classified into different classification categories according to an image classification rule to be learned. In addition, when the documents are read through a plurality of sessions, documents read in the second and succeeding sessions are assumed to be the same type of forms as the document read first arranged in the same order.

Steps S1002 and S1003 are the same as Steps S402 and S403 of FIG. 4. In Step S1004, the server 102 judges whether the input image group received in Step S1003 is an input image group read first. When the input image group is the input image group read first, the server 102 advances the process to Step S1005. When the input image group is not the input image group read first, the server 102 advances the process to Step S1006.

In Step S1005, the server 102 generates a direction determiner for each of images of the input image group. A direction determiner generating process will be described below using FIG. 11. In Step S1006, the server 102 executes an image direction unifying process. Details of the image direction unifying process will be described below using FIG. 12. Steps S1007 to S1015 are the same as Steps S405 to S413 of FIG. 4.

<Detailed Description of the Direction Determiner Generating Process According to the Second Embodiment>

Figure 11:
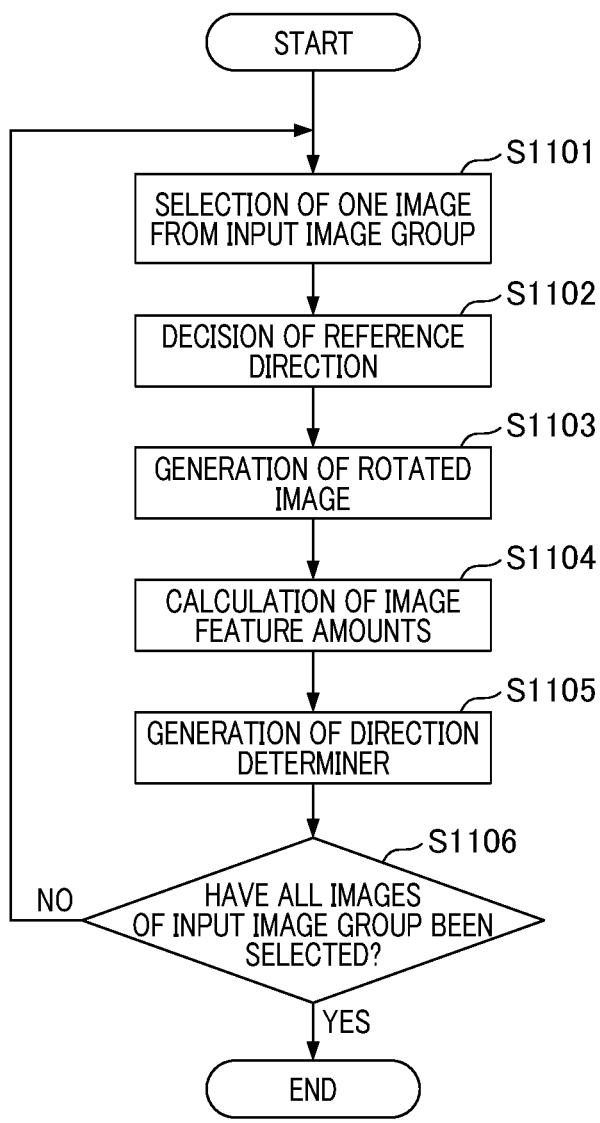
FIG. 11 is a flowchart illustrating a direction determiner generating process.

FIG. 11 is a flowchart for describing the direction determiner generating process according to the present embodiment.

Since it is assumed that the input image group is constituted by images of different forms in the present embodiment, direction determiners for each of the forms are generated. In Step S1101, the server 102 selects one image from the input image group. In the succeeding steps, processes are performed using this selected image as a reference image.

Steps S1102 to S1105 are the same as Steps S502 to Step S505 of FIG. 5. In Step S1106, the server 102 judges whether the generation of the direction determiners has been finished for all images of the input image group. When there is an image for which a direction determiner has not been generated, the process returns to Step S1101. When the generation of the direction determiners has been finished for all the images, the direction determiner generation process ends.

<Details of the Image Direction Unifying Process According to the Second Embodiment>

Figure 12:
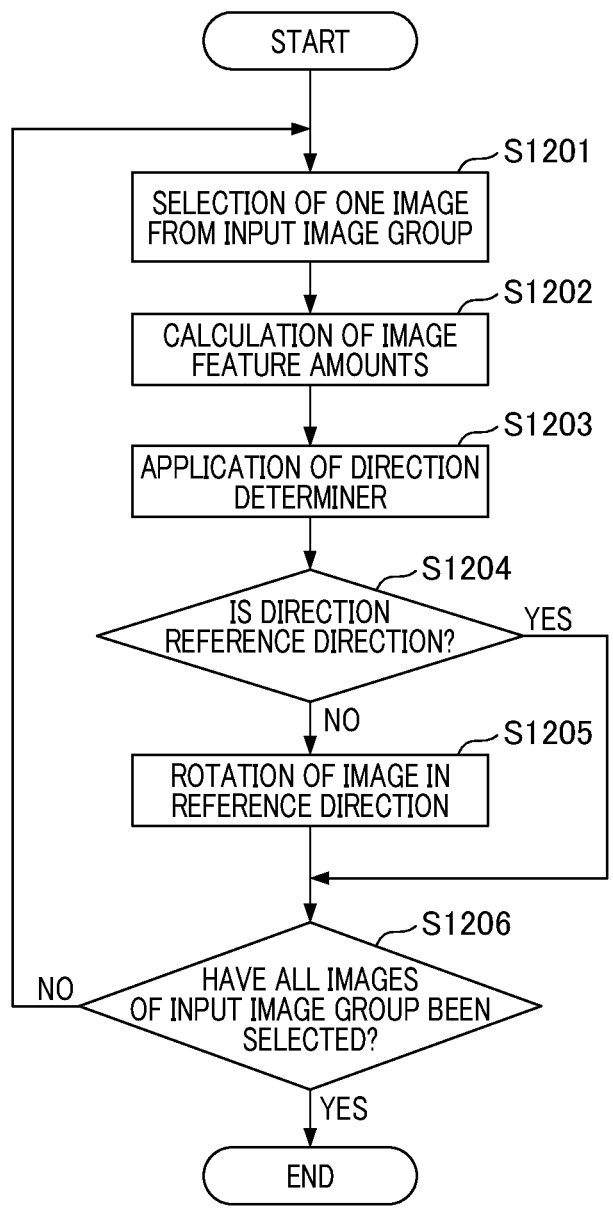
FIG. 12 is a flowchart illustrating an image direction unifying process.

FIG. 12 is a flowchart for describing the image direction unifying process according to the present embodiment.

Since it is assumed that the input image group is constituted by images of different types of forms in the present embodiment, the direction determiners that are generated for each of the forms are used, and directions of the images of the forms are unified. Steps S1201 and Step S1202 are the same as Steps S506 and S507 of FIG. 5.

In Step S1203, the server 102 executes a direction determining process. Specifically, the direction determiners that are generated in Step S1105 of FIG. 11 are applied to judge whether the image selected in Step S1201 has the reference direction decided in Step S1102 of FIG. 11 or the direction of the rotated image generated in Step S1103 of FIG. 11. Note that, since it is assumed that different types of forms are arranged in a fixed order in the present embodiment, a direction determiner appropriate for the image selected in Step S1201 using the direction determiners generated for each of the forms in Step S1105 of FIG. 11 can be applied.

Steps S1204 and S1205 are the same as Steps S509 and S510 of FIG. 5. In Step S1206, the server 102 judges whether the direction determining process has been finished for all the images of the input image group. If there is an image for which the direction determining process has not finished, the process returns to Step S1201. If the direction determining process has been finished for all the images, the image direction unifying process ends.

As described above, the present embodiment has the same effect as the first embodiment. Furthermore, according to the present embodiment, even if images that are classified into different types of classes are input from an image input device through a plurality of sessions, the directions of the input images can be unified by generating direction determiners each corresponding to the types.

Note that, in a process of classifying images newly read from an MFP using the classification rule based on learning data that has been generated in each of the embodiments described above, the direction determiners generated in S505 of FIG. 5 may be used. Specifically, when input images that are desired to be classified are read by the MFP 101, directions of the images are set to be uniform in a reference direction using direction determiners before a classification rule is applied. Accordingly, it is possible to unify the directions of input images at the time of learning the classification rule (reference direction) with the directions of the input images that are desired to be classified. In other words, even when the direction of a document set in an MFP for learning is different from the direction of a document set for classification, classification can be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (the CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-114187, filed Jun. 4, 2015, which is hereby incorporated by reference wherein in its entirety.

What is claimed is:

1. An information processing apparatus comprising:
a memory storing instructions; and
a processor which executes the instructions to perform:
receiving a plurality of input document images as learning data;
deciding a reference image from the plurality of input document images;
deciding a reference direction of the reference image;
generating a rotated image by rotating the reference image to a predetermined direction different from the reference direction of the reference image;
obtaining an image feature amount of the reference image and an image feature amount of the rotated image;
generating, based on the obtained image feature amount of the reference image and the image feature amount of the rotated image, at least one direction determiner that determines whether a direction of an input document image is the reference direction of the reference image or a direction of the rotated image;
automatically determining the direction of each of the plurality of input document images by inputting image feature amount of each of the input document images to the generated at least one direction determiner, wherein the direction determiner does not use an OCR processing;
unifying the direction of each of the plurality of input document images with the reference direction of the reference image in accordance with the determined direction; and
generating, based on image feature amount of the plurality of input document images whose directions have been unified, a classification rule to be used in classification of new document images that are different from the plurality of input document images received as the learning data.

2. The information processing apparatus according to claim 1, wherein the generated at least one direction determiner include a first direction determiner and a second direction determiner, and wherein the first direction determiner determines whether the direction of the input document image is the reference directions of the reference image, and wherein the second direction determiner determines whether the direction of the input document image is the direction of the rotated image.

3. The information processing apparatus according to claim 2,
wherein the rotated images generated by rotating the reference image having the predetermined direction by each of 90 degrees, 180 degrees, and 270 degrees,
wherein plural directions of each of the plurality of input document images are determined corresponding to the reference direction of the reference image and the directions of the rotated images, and
wherein the direction of each of the plurality of input document images is determined to be an direction corresponding to a determined direction that outputs a maximum value of degrees of certainty output by each of the determined directions.

4. The information processing apparatus according to claim 1, wherein the number of images is increased by performing a deforming process on the reference image and the rotated images, and plural directions of each of the plurality of input document images are generated by using image feature amounts of the increased number of images.

5. The information processing apparatus according to claim 4, wherein the deforming process includes a shift process, a rotating process, or an enlarging and reducing process.

6. The information processing apparatus according to claim 1, wherein, if the directions of each of the plurality of input document images are determined to be the predetermined direction by applying the determined direction, the directions of each of the plurality of input document images are unified with the reference direction of the reference image by rotating the images to the reference direction of the reference image.

7. A method for controlling an information processing apparatus comprising:
receiving a plurality of input document images as learning data;
deciding a reference image from the plurality of input document images,
deciding a reference direction of the reference image;
generating a rotated image by rotating the reference image to a predetermined direction different from the reference direction of the reference image;
obtaining an image feature amount of the reference image and an image feature amount of the rotated image;
generating, based on the obtained image feature amount of the reference image and the image feature amount of the rotated image, at least one direction determiner that determines whether a direction of an input document image is the reference direction of the reference image or a direction of the rotated image;
automatically determining the direction of each of the plurality of input document images by inputting image feature amount of each of the input document images to the generated at least one direction determiner, wherein the direction determiner does not use an OCR processing;

unifying the direction of each of the plurality of input document images with the reference direction of the reference image in accordance with the determined direction; and generating, based on image feature amount of the plurality of input document images whose directions have been unified, a classification rule to be used in classification of new document images that are different from the plurality of input document images received as the learning data.

8. A non-transitory storage medium on which is stored a computer program for making a computer execute a method for controlling an information processing apparatus, the method comprising:

receiving a plurality of input document images as learning data;

deciding a reference image from the plurality of input document images;

deciding a reference direction of the reference image;

generating a rotated image by rotating the reference image to a predetermined direction different from the reference direction of the reference image;

obtaining an image feature amount of the reference image and an image feature amount of the rotated image;

generating, based on the obtained image feature amount of the reference image and the image feature amount of the rotated image, at least one direction determiner that determines whether a direction of an input document image is the reference direction of the reference image or a direction of the rotated image;

automatically determining the direction of each of the plurality of input document images by inputting image feature amount of each of the input document images to the generated at least one direction determiner, wherein the direction determiner does not use an OCR processing;

unifying the direction of each of the plurality of input document images with the reference direction of the reference image in accordance with the determined direction; and generating, based on image feature amount of the plurality of input document images whose directions have been unified, a classification rule to be used in classification of new document images that are different from the plurality of input document images received as the learning data.

* * * * *